Dec. 5, 1933.  L. J. PETERS  1,938,534

METHOD OF AND APPARATUS FOR ELECTRICAL PROSPECTING

Filed April 7, 1930   3 Sheets-Sheet 1

Inventor
Leo J. Peters,

By Church & Church
His Attorneys

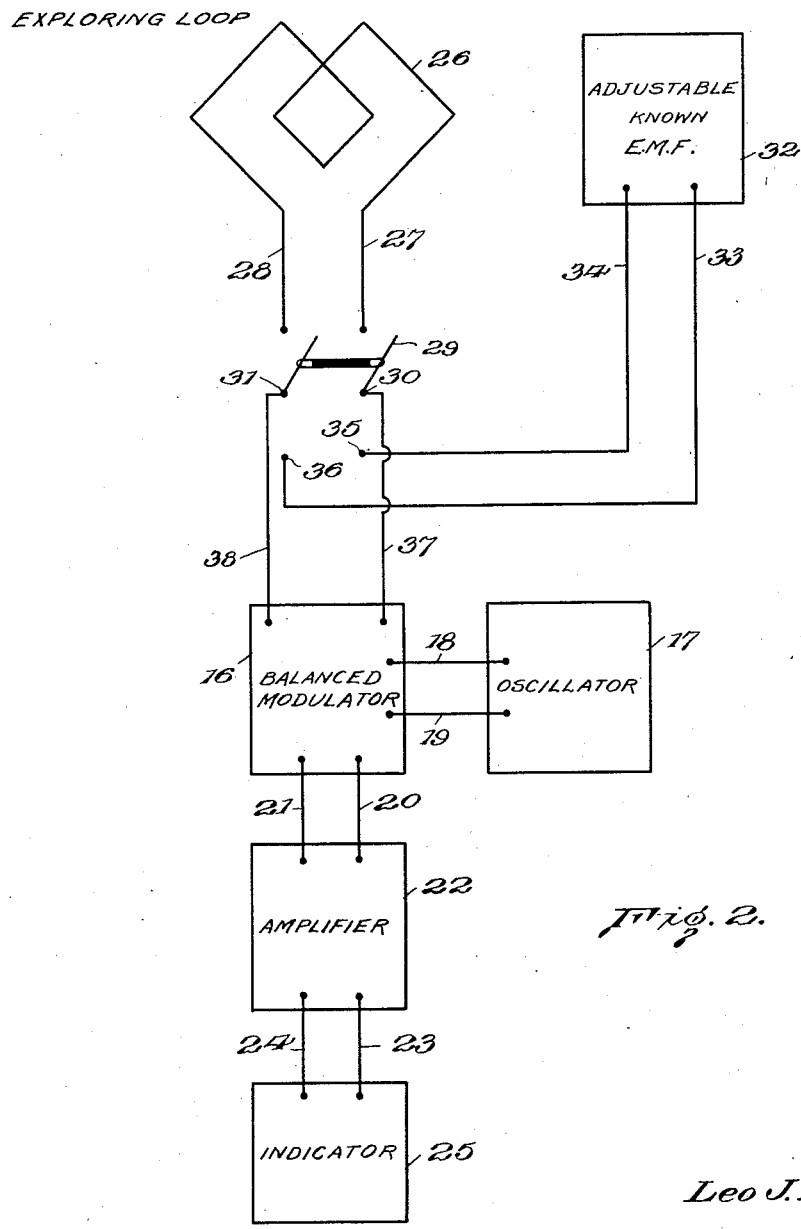

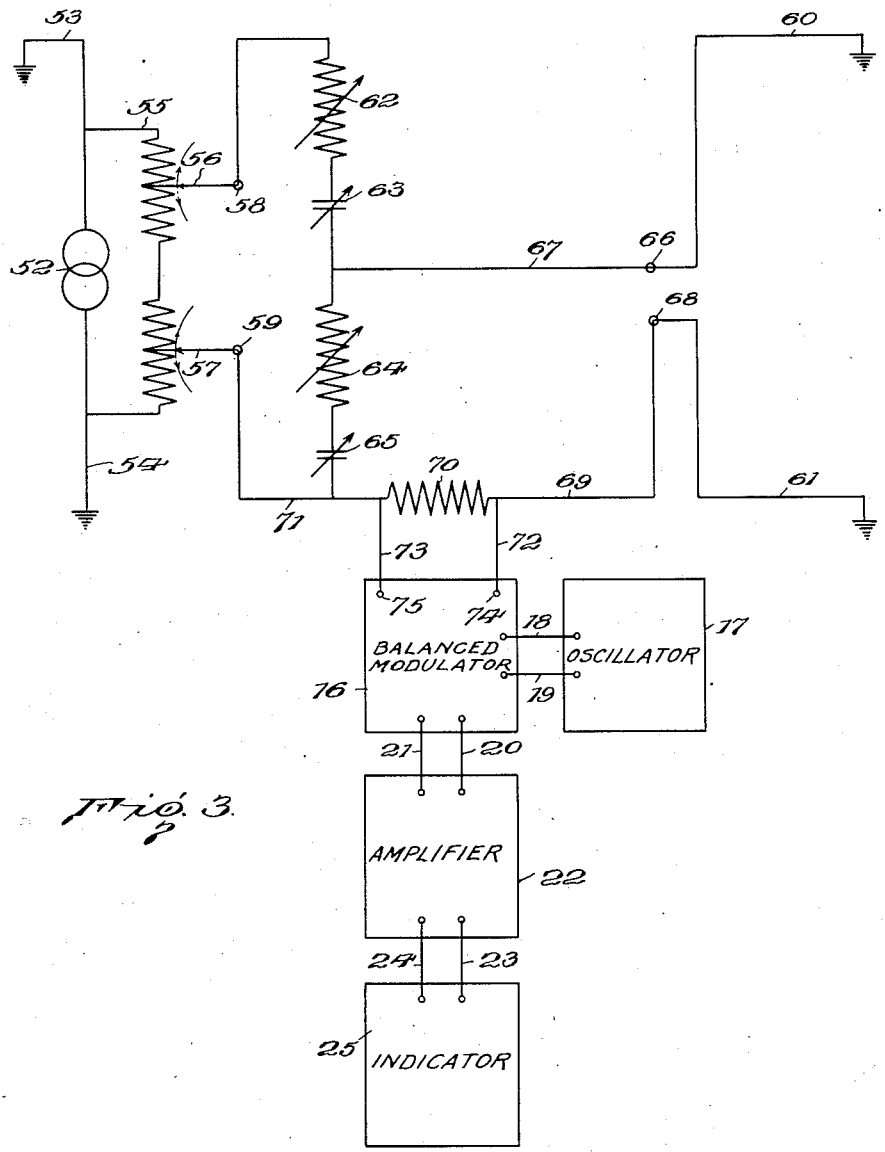

Patented Dec. 5, 1933

1,938,534

UNITED STATES PATENT OFFICE 1,938,534

METHOD OF AND APPARATUS FOR ELECTRICAL PROSPECTING

Leo J. Peters, Pittsburgh, Pa., assignor to Gulf Production Company, Houston, Tex., a corporation of Texas Application April 7, 1930. Serial No. 442,332

8 Claims. (Cl. 175—182)

My invention relates to improvements in the method of and apparatus for electrical prospecting.

In the art of electrical prospecting, it is customary to measure, study, and plot the distribution of an electromagnetic field or a potential field set up in the earth as a means for determining geological structures or the location of deposits of ore, oil or the like, the presence of which may distort the electromagnetic or potential field. In this art, it is customary to create in the earth a moderately high frequency (100 cycles or more) alternating electromagnetic or potential field, the distribution of which is to be studied, as above indicated. It is known that, from some standpoints, a low frequency alternating current would have certain great advantages in electrical prospecting, inasmuch as the low frequency waves penetrate the earth better than those of higher frequency. Where an electromagnetic or potential field of moderately high frequency, that is a frequency of more than 100 cycles per second, is employed, methods heretofore known will not give accurate data regarding geologic structure at a depth exceeding 1,500 feet, even under the most favorable conditions. As a rule, in determining the location of oil-bearing strata, it is imperative to secure data concerning geologic structure at a much greater depth since such strata are customarily found at depths exceeding 1,500 feet. Since low frequency waves penetrate the earth to far greater depth than waves of moderate or high frequency, the use of low frequency current is highly desirable in exploring deep strata. However, the currents or potentials to be measured or detected, in studying the distribution of such an electromagnetic or potential field, are very weak and it is extremely difficult to measure or detect them with accuracy, without amplification and, furthermore, to construct an amplifier, which will amplify currents or potentials of low frequency, so that they can be measured or detected accurately.

The principal object of my invention is to provide means by which an exploring current of low frequency may be used in electrical prospecting and the feeble potentials or currents to be measured, may be conveniently and easily amplified for subsequent measurement or indication.

My invention consists in impressing the low frequency currents or potentials to be measured or indicated upon a carrier wave of higher frequency in a balanced modulator, or equivalent device, by which the carrier frequency is suppressed and the low frequency currents or potentials to be measured or detected are translated or changed into currents or potentials of higher frequency and proportional amplitude, which may be easily amplified by the usual amplifiers and, subsequently, measured or indicated.

In one instance, I accomplish the objects of my invention by the devices and means set forth in the following specification. My invention is clearly defined and pointed out in the appended claims. Apparatus constituting a preferred embodiment of my invention is illustrated, diagrammatically, in the accompanying drawings, forming a part of this specification, in which—

Fig. 2 is a diagrammatic representation of apparatus embodying my invention, as applied to the comparison method of making measurements in electrical prospecting, and Fig. 3 is a diagrammatic representation of apparatus embodying my invention, as applied to the measurement of a terrestrial potential field.

Figure 1:
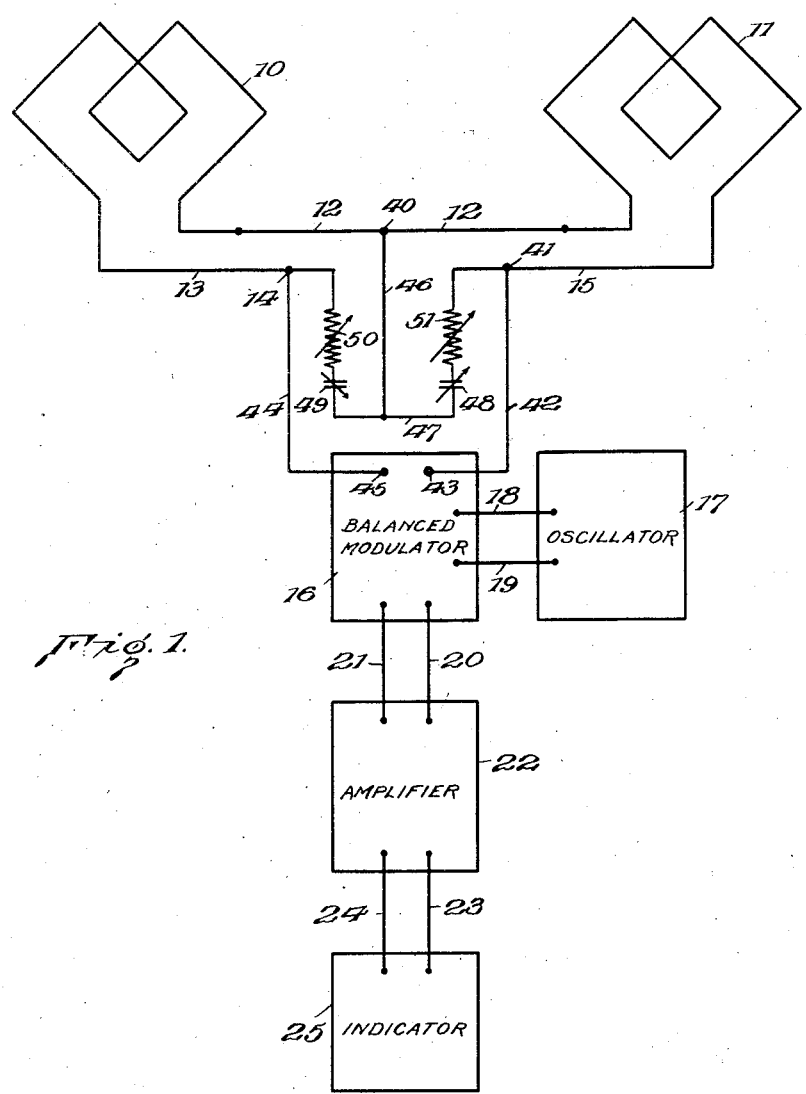
Figure 1 is a diagrammatic representation of an apparatus embodying my invention, as applied to the balance method of making measurements of a terrestrial electromagnetitc field in electrical prospecting.

In that branch of the art of electrical prospecting which involves the study of the distribution of a terrestrial electromagnetic field, it is customary to generate such a field as, for instance, by applying to the surface of the ground an extended loop, the terminals of which are connected to an oscillator or generator of alternating current. In accordance with my invention, I propose to use a low frequency current for prospecting, for instance, a frequency of ten cycles per second.

According to the balance method of measurement, two coils or loops are used, one loop being so located that the phase and intensity of the potential induced therein are known, while, in the other loop, known as the exploring loop, the phase and intensity of the potential induced therein by the terrestrial electromagnetic field are unknown. These two loops are connected through a balancing device which includes suitable adjustable electrical circuit elements, such as resistance and capacity. These elements may be adjusted so that the potential across two suitably selected terminals of the balancing device shall be zero, and when this condition exists, there is a known relation between the values of the circuit constants and the phase and magnitude of the known and unknown E. M. F.'s induced in the loops, thus permitting the phase and magnitude of the unknown E. M. F. to be determined. In accordance with this method of studying the terrestrial electromagnetic field, one of the loops is located at a point near the surface of the earth, where the phase, intensity and direction of the field are known, and the exploring loop is looped at a distant point on the earth's surface, where the phase, intensity and direction of the field are to be determined, and the adjustable circuit elements of the balancing device are adjusted until the potential across the suitably selected balance terminals is zero, thus permitting a measurement of those quantities by which the intensity, phase and direction of the terrestrial electromagnetic field may be determined at the location of the exploring loop. When the field is of low frequency, it has been practically impossible, by means heretofore known, to secure an accurate determination of the balance point, due to the weakness of the currents or potentials and the difficulties of amplifying them.

In accordance with my invention, I propose to connect, across the balance terminals of the balancing device, a balanced modulator, which balanced modulator is also connected to an oscillator supplying a current of higher frequency, as, for instance, a frequency of two hundred cycles per second. This balanced modulator is a device well known in the communications art and needs no further detailed description here. One characteristic of such a balanced modulator is that the output current therefrom has two frequency components and that the amplitude of the output current is proportional to the amplitude of the input current. Current of the frequency supplied by the oscillator is suppressed so that, if the frequency of the terrestrial electromagnetic field be $f'$ and the frequency of the oscillator be $f^0$, the output of the balanced modulator will have the two frequency components $f^0+f'$ and $f^0-f'$. The amplitude of the output of the balanced modulator, moreover, is proportional to the amplitude of the potential across the balance terminals of the balancing device, but this potential has been translated to potentials of higher frequencies. I propose to connect the output of the balanced modulator to an amplifier. Taking the frequencies stated, for example, where the frequency of the terrestrial electromagnetic field used for prospecting is ten cycles per second and the oscillator frequency two hundred cycles per second, the frequencies of the output potential would be 190 and 210 cycles per second. It is easy to construct an amplifier to amplify potentials of such frequencies, whereas, it is very difficult to amplify potentials having frequencies of thirty cycles or lower. The output from the amplifier is then led to a suitable indicating or signaling device such as a telephone receiver, a thermocouple and meter, an oscillograph or a galvanometer.

Referring to Fig. 1, which illustrates this arrangement diagrammatically in connection with the balance system of making measurements of such a terrestrial electromagnetic field, the two loops 10 and 11 are connected to terminal 40 of the balancing device by the lead 12. The other end of loop 10 is connected by lead 13 to terminal 14 of the balancing device and, likewise, the other end of loop 11 is connected by lead 15 to the terminal 41 of the balancing device. The balancing device may include variable resistances 50 and 51, and variable capacities 48 and 49, the variable resistance 50 and the variable capacity 49 being connected in series between the terminal 14 and the lead 47 and, likewise, the variable resistance 51 and variable capacity 48 being connected in series between terminal 41 and lead 47. Lead 47 is connected with the terminal 40 by the conductor 46. These electrical circuit elements are adjustable and may be adjusted so as to balance the potential induced in loop 10 against the potential induced in loop 11, and, when this state of balance exists, the potential across the terminals 14 and 41 will be zero. Having adjusted the variable resistances and capacities until this condition of balance has been established, that is, until the potential across the terminals 14 and 41 is zero, the amount of resistance and capacity introduced into the circuits may be read from the usual dials or indicating devices and thereby the relation of the phase, magnitude and direction of the terrestrial electromagnetic field at the location of loop 11 may be determined from the known phase, magnitude and direction of the terrestrial electromagnetic field at the location of loop 10. In utilizing this scheme for measuring a terrestrial electromagnetic field, it is necessary to determine accurately the condition of zero potential across the terminals 14 and 41, and, to accomplish this, terminals 14 and 41 of the balancing device are connected by leads 44 and 42 to input terminals 45 and 43, as illustrated diagrammatically, of a balanced modulator. The oscillator 17 is also connected to the balanced modulator by the leads 18 and 19. As already stated, one characteristic of this balanced modulator is that it acts to suppress current or potential of the frequency of the oscillator so that the output of the balanced modulator has the frequencies $f^0+f'$ and $f^0-f'$ where $f'$ represents the frequency of the input and $f^0$ the frequency of the current or potential furnished by the oscillator 17. The output of the balanced modulator is proportional in amplitude to the input at terminals 45, 43. The balanced modulator is connected by the output leads 20, 21 with an amplifier 22, which may be either tuned or untuned, and the amplifier is connected by leads 23, 24 to a suitable indicating or signaling device 25, such as a telephone receiver, a thermo-couple and meter, an oscillograph or a galvanometer. If a telephone receiver, oscillograph or galvanometer is used, it is desirable to have it tuned. Although, by way of example, I have suggested the use of an exploring frequency of ten cycles per second and a current frequency of two hundred cycles per second furnished by oscillator 17, my invention is not to be restricted or limited to such specific frequencies, as I contemplate the use of any desirable exploring frequency and the use of any carrier frequency within the range of from ten to ten thousand cycles per second.

It will be understood that the balancing device which I have described, including the variable resistances and capacities connected between the terminals 14 and 41, is only one of several forms of balancing device or system which may be used in connection with this method of measuring a terrestrial electromagnetic field, the only essential feature being that a balancing device be used of such a nature that the electrical circuit elements thereof may be adjusted so as to cause the potential across two suitably selected terminals to be zero and that, when this condition exists, the intensity of the terrestrial electromagnetic field at the unknown location may be determined from the values of the electrical circuit elements, the known constants of the system and the intensity of the field at the location of the known loop. It will also be understood that the current or potential may be induced in the loop 10, representing a known field intensity, by direct induction from a coil or conductor connected with a source of alternating current, rather than from a terrestrial electromagnetic field, as in the example specifically illustrated and described above. In either case, the application of my invention will be the same, the principle being that of balancing induced potential of unknown value against a potential of known value.

My invention is also applicable to the comparison method of making measurements in electromagnetic prospecting in which, as is well known, the amplitude of a current or potential induced in an exploring coil by the terrestrial electromagnetic field is compared with the known and adjustable amplitude of a source of current or potential of like frequency, serving as a standard of comparison. In using my invention with this method of making measurements, I propose to provide again a balanced modulator and an oscillator and to connect alternately the exploring loop and the adjustable source of current or potential of known amplitude with the input of the balanced modulator, the output of which is to be connected to an amplifier, to which is connected a suitable signaling or indicating device, as already explained in connection with the balance system of measurement.

Referring to Fig. 2, the exploring loop 26 has the leads 27, 28, leading therefrom which may be connected to the terminals 30, 31 by the double throw switch 29. The terminals 30, 31 are connected by leads 37, 38 to the input of the balanced modulator 16. The oscillator 17 is connected to the balanced modulator by leads 18, 19, and current of the frequency of oscillator 17 is suppressed by the balanced modulator, as already explained. The output leads 20, 21 connect the balanced modulator with an amplifier 22 and the latter is connected, by leads 23, 24, with a suitable indicating or signaling device such as a telephone receiver, thermo-couple and meter, an oscillograph, or a galvanometer. If a telephone receiver, oscillograph or galvanometer is used, it is desirable, but not necessary to have it tuned. 32 represents the source of current or potential of the same nature as the current or potential in the exploring loop 26, but of known amplitude, and this apparatus is adjustable so as to vary the known amplitude. This source is connected by leads 33, 34 to the terminals 35, 36 which may be connected to the amplifying and signaling apparatus by the poles of the double-throw switch 29. It will thus be seen that either the known adjustable quantity 32, or the unknown quantity represented by the exploring loop 26, may be connected to the amplifying and signaling apparatus and, by reversing the position of the switch 29, the known quantity may be compared with the unknown and the known quantity adjusted until the signaling device indicates that it is identical with the unknown quantity represented by the exploring loop 26, thus determining the amplitude of the current or potential induced in the exploring loop 26 by the terrestrial electromagnetic field, and indicating the intensity and direction of said field in accordance with well known methods.

My invention is also applicable to that branch of the art of electrical prospecting in which the distribution of electrical potential in the earth, with reference to a source of potential, is studied in order to determine geological structure or the location of deposits of ore, oil, and the like. According to this method of electrical prospecting, electrodes connected with a source of alternating current are inserted in the earth. The source of alternating current, to which said electrodes are directly connected, also serves as a source of potential of known magnitude. A pair of exploring electrodes are inserted in the earth at the location at which the distribution of potential from the source of current is to be studied, said exploring electrodes being connected with the source of potential of known magnitude by a balancing device including adjustable electrical circuit elements which may be adjusted until the potential across a pair of suitably connected terminals is zero. When that condition has been established, the values of the adjustable electrical circuit elements having been ascertained by reading the instruments, and the magnitude of the source of potential being known, the difference of potential between the exploring electrodes may be determined, thus determining the distribution of potential in the earth with reference to the source of alternating current. Here, also, it is desirable to use, as the source of potential, alternating current of low frequency, for instance, ten cycles per second, and it is important to determine the condition of balance, that is, the condition of zero potential across the suitably selected terminals of the balancing device, with accuracy, and, to that end, I propose to connect said terminals to the input of a balanced modulator to which an oscillator is connected, as in the apparatus already described, and to connect the output of said balanced modulator with an amplifier and the output of said amplifier with a suitable signaling or indicating device, thus translating the potential of low frequency, across the balance terminals of the balancing device, to a potential of higher frequency and proportional amplitude which may be easily amplified and indicated or detected by conventional amplifying and indicating apparatus.

Referring now to Fig. 3, which illustrates diagrammatically one embodiment of my invention as applied to the determination of the balance point, or condition of zero potential, in connection with the study of the distribution of potential or electrical intensity on the surface of the earth, by means of exploring electrodes, a source of alternating current 52, preferably of low frequency, such as ten cycles per second, has its terminals connected to the electrodes 53, 54, which are inserted in the surface of the earth. A potentiometer 55 is connected across the terminals of the source 52 of alternating current, this potentiometer thus constituting a source of electric potential of known and variable magnitude. Terminals 58, 59 of the balancing device are connected by leads 56, 57 adjustably to the resistance element of the potentiometer. At the location where the terrestrial potential or electrical intensity is to be studied, two exploring electrodes 60 and 61 are inserted in the surface of the earth. The exploring electrode 60 is connected to a terminal 66 of the balancing device, while the exploring electrode 61 is connected to the terminal 68 of said device. The terminal 58 of the balancing device is connected to one end of a variable resistance 62, the opposite end of which is connected to a variable capacity 63, the opposite side of which is connected to one end of another variable resistance 64. The opposite end of the variable resistance 64 is connected to one side of another variable capacity 65, the opposite side of which is connected to a lead 71, connecting with the terminal 59. The terminal 66 of the balancing device, to which the exploring electrode 60 is connected, is connected by a lead 67 to the lead connecting the variable capacity 63 and the variable resistance 64. The terminal 68, to which the exploring electrode 61 is connected, is connected by a lead 69 to a resistance 70, the opposite end of which is connected to the lead 71 extending to the terminal 59. The balance terminals 74, 75 are connected across the resistance 70 by the leads 72, 73, and these balance terminals are so selected that, when the potential across said terminals is zero, this condition having been brought about by adjusting the resistances 62, 64 and capacities 63, 65, the difference in potential between the exploring electrodes 60 and 61 may be determined in magnitude and phase by reference to the known potential, having ascertained the values to which the resistances and capacities were adjusted in order to bring about a condition of balance, or zero potential, across the balance terminals 74, 75. In order to determine this condition of zero potential with accuracy, notwithstanding the use of low frequencies, the terminals 74, 75 are connected to the input of the balanced modulator 16. The oscillator 17 is connected to the balanced modulator by leads 18, 19, and the current of high frequency from oscillator 17 is suppressed by the balanced modulator, as already explained. The output leads 20, 21, connect the balanced modulator with an amplifier 22 and the latter is connected by leads 23, 24 with a suitable indicating or signaling device such as a telephone receiver, thermocouple and meter, and oscillograph or a galvanometer. If a telephone receiver, oscillograph or galvanometer is used, it is desirable, but not necessary, to have it tuned.

Of course, it is to be understood that the balancing device illustrated in the accompanying diagram is merely illustrative of a number of different forms of device which may be used for this purpose, the object of the balancing device being to balance the unknown difference in potential against the known, and the condition of balance being determined by observation of the potential across the suitably selected balance terminals of the balancing device, the condition of balance being attained when the potential across such balance terminals becomes zero.

It will be seen from the foregoing description that I have provided a method and apparatus which greatly facilitates the measurement of the intensity and distribution of the terrestrial electromagnetic or potential field, and enables me to make use of a very low exploring frequency which is translated into higher frequencies of proportional amplitude, which higher frequencies may be easily amplified before passing to an indicator or signaling device.

I am aware that the means illustrated herein may be changed considerably without departing from the spirit of my invention and, therefore, I claim my invention broadly, as indicated by the appended claims.

What I claim is:

1. The method of electrically determining the character of geologic structure beneath the surface of the earth which comprises generating an alternating exploring current having a frequency of less than 100 cycles per second, applying said exploring current to the earth in such manner as to set up therein a low frequency electric or electro-magnetic field, deriving a low frequency current from the earth thus provided with said low frequency electric or electro-magnetic field, translating said earth-derived low frequency current into current having a frequency greater than 100 cycles per second and an amplitude proportional to the amplitude of said earth-derived current, and determining the character of said earth-derived low frequency current by an indicating device activated by said current of higher frequency and proportional amplitude.

2. The method of electrically determining the character of geologic structure beneath the surface of the earth which comprises generating an alternating exploring current having a frequency of less than 100 cycles per second, applying said exploring current to the earth in such manner as to set up therein a low frequency electric or electro-magnetic field, deriving a low frequency current from the earth thus provided with said low frequency electric or electro-magnetic field, translating said earth-derived low frequency current into current having a frequency greater than 100 cycles per second and an amplitude proportional to the amplitude of said earth-derived current, amplifying said translated current of higher frequency, and determining the character of said earth-derived low-frequency current by an indicating device activated by said current of higher frequency and proportional amplitude.

3. The method of electrically determining the character of geologic structure beneath the surface of the earth which comprises generating an alternating exploring current having a frequency of less than 100 cycles per second, applying said exploring current to the earth in such manner as to set up therein a low frequency electric or electro-magnetic field, deriving a low frequency current from the earth thus provided with said low frequency electric or electro-magnetic field, translating said earth-derived low frequency current into current having a frequency greater than 100 cycles per second and an amplitude proportional to the amplitude of said earth-derived current, and determining the character of said earth-derived low frequency current by an indicating device tuned to and activated solely by said current of higher frequency and proportional amplitude.

4. In apparatus for electrically determining the character of geologic structure existing beneath the earth by the use of an alternating terrestrial electrical field of low frequency of the order of 100 cycles per second or less, the combination of means for deriving low frequency current from the earth thus provided with a low frequency terrestrial field, a source of alternating current of relatively high frequency, a modulator connected with said low frequency current-deriving means and said source of relatively high frequency current and operative to provide a modulated current of relatively high frequency having an amplitude proportional to the amplitude of the earth-derived current, and indicating means activated by said modulated current of relatively high frequency for yielding indications characteristic of the earth-derived low frequency current.

5. In apparatus for electrically determining the character of geologic structure existing beneath the earth by the use of an alternating terrestrial electrical field of low frequency of the order of 100 cycles per second or less, the combination of means for deriving low frequency current from the earth thus provided with a low frequency terrestrial field, a source of alternating current of relatively high frequency, a modulator connected with said low frequency current-deriving means and said source of relatively high frequency current and operative to provide a modulated current of relatively high frequency having an amplitude proportional to the amplitude of the earth-derived current, means connected to the output of said modulator for increasing the amplitude of said modulated relatively high frequency current, and indicating means activated by the amplified modulated current of relatively high frequency for yielding indications characteristic of the earth-derived low frequency current.

6. In apparatus for electrically determining the character of geologic structure existing beneath the earth by the use of an alternating terrestrial electrical field of low frequency of the order of 100 cycles per second or less, the combination of means for deriving low frequency current from the earth thus provided with a low frequency terrestrial field, a source of alternating current of relatively high frequency, a modulator connected with said low frequency current-deriving means and said source of relatively high frequency current and operative to provide a modulated current of relatively high frequency having an amplitude proportional to the amplitude of the earth-derived current, and indicating means activated solely by modulated current having amplitude proportional to the amplitude of said earth-derived current for yielding indications characteristic of said earth-derived low frequency current.

7. In apparatus for electrically determining the character of geologic structure existing beneath the surface of the earth by the use of an alternating terrestrial electrical field of low frequency of the order of 100 cycles per second or less, the combination of a pair of low frequency circuits the characteristics of one of which are known or readily determinable and the characteristics of the other of which are variable in accordance with the character of underlying geologic structure, variable impedance balancing units associated with one or both of said circuits and by which said circuits may be adjusted to a state of electrical equivalency, and means associated with said circuits for indicating any lack of electrical equivalency therebetween, said means comprising means associated with said circuits for translating low frequency currents flowing therein into currents of relatively high frequency and proportional amplitude, and indicating means connected to the output of said translating means and responsive to translated current of relatively high frequency and proportional amplitude.

8. The method of electrically determining the character of geologic structure beneath the surface of the earth which comprises generating an alternating exploring current having a frequency of less than 100 cycles per second, applying said exploring current to the earth in such manner as to set up therein a low frequency electric or electromagnetic field, deriving a low frequency current from the earth thus provided with said low frequency electric or electromagnetic field, applying said earth-derived low frequency current of undetermined values in opposition to a similar low frequency current of known or readily determinable values, translating any current representing a lack of equivalency between said low frequency currents of known and unknown values into a current having a frequency greater than 100 cycles per second and an amplitude proportional to the amplitude of current representing a lack of equivalency, amplifying said higher frequency current, and determining the character of said earth-derived current by means including an indicating device activated by said amplified higher frequency current and a variable impedance balancing unit.

LEO J. PETERS.